(12) United States Patent
Kobayashi et al.

(10) Patent No.: US 9,279,465 B2
(45) Date of Patent: Mar. 8, 2016

(54) DISC BRAKE PAD ASSEMBLY

(75) Inventors: Daisuke Kobayashi, Tokyo (JP); Yoshihiro Hirata, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/344,414

(22) PCT Filed: Sep. 13, 2012

(86) PCT No.: PCT/JP2012/073522
§ 371 (c)(1),
(2), (4) Date: Mar. 12, 2014

(87) PCT Pub. No.: WO2013/039175
PCT Pub. Date: Mar. 21, 2013

(65) Prior Publication Data
US 2014/0339028 A1    Nov. 20, 2014

(30) Foreign Application Priority Data
Sep. 13, 2011  (JP) .................................. 2011-199674

(51) Int. Cl.
| F16D 65/097 | (2006.01) |
| F16D 65/092 | (2006.01) |
| F16D 65/095 | (2006.01) |
| F16D 65/00  | (2006.01) |

(52) U.S. Cl.
CPC ........ F16D 65/0971 (2013.01); F16D 65/0006 (2013.01); F16D 65/092 (2013.01); F16D 65/095 (2013.01)

(58) Field of Classification Search
CPC .............. F16D 65/0006; F16D 65/097; F16D 65/0971; F16D 65/0977; F16D 65/0979
See application file for complete search history.

(56) References Cited

U.S. PATENT DOCUMENTS 5,975,252 A * 11/1999 Suzuki et al. ................. 188/73.1
7,237,659 B2 * 7/2007 Murayama ................. 188/73.35
(Continued)

FOREIGN PATENT DOCUMENTS

| CN | 1807921 A     | 7/2006 |
| EP | 2 757 281 A1  | 7/2014 |
| FR | 2925635 A1 *  | 6/2009 |
| JP | S54-145789 U  | 10/1979 |

(Continued)

OTHER PUBLICATIONS

Extended European Search Report issued on Dec. 10, 2015 in European patent application 12832229.4.

*Primary Examiner* — Anna Momper
(74) *Attorney, Agent, or Firm* — Drinker Biddle & Reath LLP

(57) ABSTRACT

A disc brake pad assembly includes a pad and a shim plate. The shim plate includes locking pieces which are bent from a main body portion towards a pressure plate. The locking pieces are brought into abutment with circumferential edge portions of the pressure plate so as to be displaced in a rotating direction of a rotor. Projecting portions are formed at portions of the circumferential edge portion which are brought into abutment with one surface of each of the locking pieces. A circumferential central portion of a part of each of the projecting portions which faces the one surface projects further than both circumferential end portions thereof. The circumferential edge portion and the one surface of each of the locking pieces are spaced apart from each other at portions of the one surface which lie close to both circumferential end portions thereof.

3 Claims, 15 Drawing Sheets

(56) References Cited

U.S. PATENT DOCUMENTS

| | | | |
|---|---|---|---|
| 7,370,736 B2* | 5/2008 | Anda et al. | 188/73.36 |
| 7,481,304 B2* | 1/2009 | Tsurumi et al. | 188/73.36 |
| 2003/0213658 A1* | 11/2003 | Baba | 188/73.37 |
| 2003/0221919 A1* | 12/2003 | Kumamoto et al. | 188/73.37 |
| 2006/0157307 A1 | 7/2006 | Tsurumi et al. | |

FOREIGN PATENT DOCUMENTS

| | | |
|---|---|---|
| JP | H04-138137 U | 12/1992 |
| JP | 2000-205311 A | 7/2000 |
| JP | 2005-121174 A | 5/2005 |
| JP | 2006-200560 A | 8/2006 |
| JP | 2009-030719 A | 2/2009 |

* cited by examiner

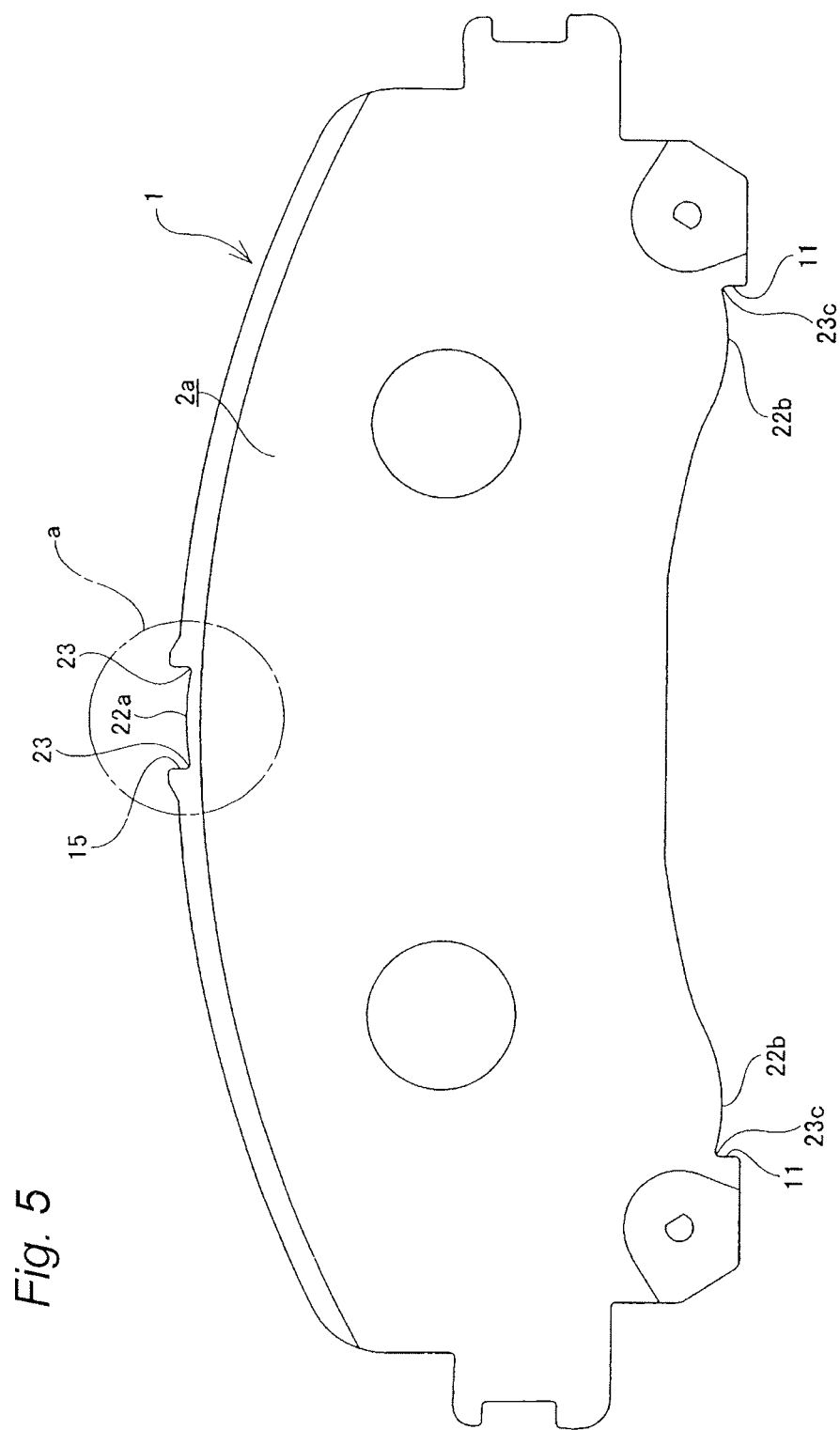

DISC BRAKE PAD ASSEMBLY

TECHNICAL FIELD

The present invention relates to an improved disc brake pad assembly.

BACKGROUND ART

In disc brakes used to brake a motor vehicle, a pair of pads are disposed so as to sandwich a rotor which rotates together with a wheel, and when the brakes are applied, both the pads are pressed against both axial side surfaces of the rotor. There are two types of basic constructions for such disc brakes: one is a construction with a floating caliper, and the other is a construction with an opposed-piston fixed caliper. In the case of either of the constructions, the rotor which rotates together with the wheel is strongly sandwiched from both axial sides thereof by the pair of pads when the brakes are applied. In both the pads, a lining is additionally attached to a front surface of a pressure plate which has sufficient rigidity. Then, when the brakes are applied, a back surface of the pressure plate is pressed, whereby a front surface of the lining is brought into frictional contact with both axial side surfaces of the rotor. When referred to in this description and the claims, axial direction, circumferential direction and radial direction mean an axial direction, circumferential direction and radial direction of a rotor, respectively, in such a state that a disc brake pad assembly is assembled to a disc brake unless otherwise described. In addition, a circumferential edge portion means an inward circumferential edge portion or an outward circumferential edge portion with respect to the radial direction of the rotor.

When the brakes are applied, an abutment portion where the axial side surfaces of the rotor and the front surfaces of the linings of the pads are brought into abutment with each other and which constitutes a portion where a frictional force is exerted is offset axially from an abutment portion where the pressure plates and supports or a caliper are brought into abutment with each other and which constitutes an anchor portion which bears brake torque which is exerted on both the pads by at least an amount equaling a total thickness of the linings of both the pads (the frictional portion is offset from the brake torque bearing portion). Then, a moment is exerted on both the pads in a direction in which a leading side of the rotor approaches (falls towards) both the pads based on the offset equaling the thickness of the linings, and this easily makes the orientations of both the pads unstable. In case the orientations of both the pads become unstable when the brakes are applied, it becomes difficult that both the pads behave smoothly, and these pads are caused to vibrate, whereby noise referred to as a "brake squeal" is easily generated or the degree of partial wear of the linings easily becomes remarkable.

In order to mitigate the brake noise or the partial wear described above, it is conventional and widely accepted practice to sandwich a shim plate between a back surface of a pressure plate which makes up a pad and a distal end face of a piston which constitutes a pressing surface which presses the back surface or an inner surface of a caliper claw portion. In a shim plate like this, although a single-plate configuration is adopted in which only a single shim plate is used, in order to improve the effect of suppressing the brake squeal or the partial wear, a double-plate configuration is also widely adopted in which an inner shim plate and an outer shim plate are fittingly superposed on each other. Whether the single-plate configuration or the double-plate configuration is adopted, it is practiced that locking pieces which are formed at a plurality of locations on inward and outward circumferential edge portions of a shim plate are brought into engagement with inward and outward circumferential edge portions of the pressure plate, whereby the shim plate is supported on a back side of the pressure plate so as to slide slightly in a circumferential direction in such a state that the shim plate is prevented from being dislocated radially from the pressure plate.

Patent Literature 1 describes a construction as shown in FIGS. 13 to 15 as a disc brake pad assembly which has the function described above. In the disc brake pad assembly of the conventional construction, a combined shim plate 5 which is made up of an inner shim plate 3 and an outer shim plate 4 is mounted on a back surface of a pressure plate 2 which makes up a pad 1. In the pad 1, a lining 6 is additionally attached and fixed to a front surface of the pressure plate 2 (which is a surface which faces a side surface of a rotor (not shown) when assembled to a disc brake) with a large fastening force so as not to be forced to deviate by brake torque exerted when the brakes are applied. The inner shim plate 3 is made of a metallic plate which is a stainless steel plate, a rubber-coated stainless steel plate or the like and includes a flat plate-shaped inner main body portion 7 and a plurality of inner locking pieces 8a, 8b, 8c. Additionally, a plurality of through holes 9, 9 are formed in the inner main body portion 7 so as to hold a grease therein. In addition, of radially inward and outward circumferential edge portions of the pressure plate 2, a locking recess portion 10 is formed in a circumferential central portion of the radially outward edge portion, and a pair of step portions 11, 11 are formed at portions of the radially inward edge portion which lie close to circumferential ends thereof. In the inner locking pieces 8a, 8b, 8c of the inner shim plate 3, the radially outward inner locking piece 8a is brought into engagement with the locking recess portion 10, while the radially inward inner locking pieces 8b, 8c are brought into engagement with the step portions 11, 11, whereby the pressure plate 2 is held from both radial sides thereof by the inner locking pieces 8a, 8b, 8c. In this state, the inner shim plate 3 is attached to a back surface side of the pressure plate 2 in such a state that circumferential and radial displacements thereof are restricted (actually prevented).

In addition, the outer shim plate 4 is made of a metallic plate which is a stainless steel plate or the like and includes a flat plate-shaped outer main body portion 12 and a plurality of outer locking pieces 13a, 13b, 13c. In the outer shim plate 4 described above, the outer main body portion 12 is fittingly superposed on the inner main body portion 7 with the outer locking pieces 13a, 13b, 13c fittingly superposed on the inner locking pieces 8a, 8b, 8b, respectively. In this state, the outer shim plate 4 is assembled to the inner shim plate 3 so as to be displaced in a circumferential direction. Because of this, a circumferential widthwise dimension of the outer locking piece 13a is made smaller than circumferential widthwise dimensions of the locking recess portion 10 and the inner locking piece 8a, and a distance between circumferential outer edges of the outer locking pieces 13b, 13c is made smaller than a distance between the step portions 11, 11.

In the case of the conventional construction having the configuration described above, the inner locking pieces 8a, 8b, 8c which are provided on the inner shim plate 3 are brought into abutment with the circumferential edge portions of the pressure plate 2. Then, the outer locking pieces 13a, 13b, 13c are brought into abutment with the inner locking pieces 8a, 8b, 8c, respectively, so as to slide circumferentially. The outer locking pieces 13a, 13b, 13c which are provided on the outer shim plate 4 which is displaced circumferentially relative to the pressure plate 2 when the brakes are applied and released never slide relative to the circumferential edge portions of the pressure plate 2. Consequently, the sliding properties of the outer locking pieces 13a, 13b, 13c relative to the circumferential edge portions of the pressure plate 2 do not have to be taken into consideration.

In the case of the conventional construction described above, since the inner locking pieces 8a, 8b, 8c are fittingly superposed on the outer locking pieces 13a, 13b, 13c, respectively, the projecting amount of the outer locking pieces 13a, 13b, 13c from the circumferential edges of the pressure plate 2 is increased. As a result of this, the prevention of interference of the outer locking pieces 13a, 13b, 13c with other constituent members of the disc brake, for example, a caliper needs to taken into consideration. Although the installation space of the disc brake is limited, the constituent members including the caliper and the like are required to have a large magnitude of rigidity. Because of this, the fact that the prevention of the interference needs to be taken into consideration becomes disadvantageous from the viewpoint of ensuring the degree of freedom in designing the disc brake.

In order to suppress the projecting amount of the portions of the shim plate from the circumferential edges of the pressure plate to a low level, it is considered that the locking pieces which are formed on the shim plate (for example, the outer shim plate 4 in the conventional construction described above) are brought into direct engagement with the circumferential edges of the pressure plate. However, when the locking pieces are simply brought into direct engagement with the circumferential edge portions, circumferential end edges of the locking pieces bite into the circumferential edge portions, and a smooth circumferential displacement of the shim plate relative to the pressure plate is interrupted. Particularly, the surface of the pressure plate including the circumferential edge portions is covered with a coated film for rust prevention, as well as ensuring the appearance thereof. Since the hardness of the coated film is far lower than the hardness of the locking pieces, the circumferential end edges of the locking pieces are easy to bite into the coated film as the shim plate is displaced circumferentially relative to the pressure plate. Additionally, when the circumferential end edges of the locking pieces bite into the coated film, the smooth circumferential displacement of the shim plate is interrupted, and additionally, the coated film is stripped off, leading to a problem with rust prevention.

As a construction which deals with these situations, Patent Literature 2 describes a construction in which a spherical projecting portion is formed on a portion of a locking piece which corresponds to a circumferential edge portion of a pressure plate. According to the construction described therein, it is possible to prevent the locking piece from biting into the circumferential portion of the pressure plate. However, it is difficult to form a spherical projecting portion on a shim plate made of hard metal such as stainless spring steel, and the yield of spherical projecting portions is deteriorated by the generation of cracks or the like. Thus, it is considered that a significant increase in production costs cannot be avoided. Additionally, even though a spherical projecting portion can be formed, a step of forming the locking pieces by bending a material such as the hard metallic plate and a step of forming the spherical projecting portions on the locking pieces need to be separated, which inevitably increases the production costs.

CITATION LIST

Patent Literature

Patent Literature 1: JP-A-2006-200560
Patent Literature 2: JP-A-2009-30719

SUMMARY OF INVENTION

Technical Problem

In view of the situations described above, an object of the invention is to provide at low cost a disc brake pad assembly which enables locking pieces which are formed on a shim plate which is displaced in a circumferential direction relative to a pressure plate to be brought into direct abutment with circumferential edge portions of the pressure plate and which also enables the locking pieces to be displaced smoothly in the circumferential direction relative to the circumferential portions.

Solution to Problem

The above object of the invention is achieved by a disc brake pad assembly having the following configurations.

(1) A disc brake pad assembly includes a pad and a shim plate.

The pad includes a lining additionally attached to a front surface of a pressure plate and is disposed at a portion facing an axial side surface of a rotor.

Additionally, the shim plate includes a flat plate-shaped main body portion and a plurality of locking pieces which are bent from circumferential edge portions of the main body portion towards the pressure plate. Then, the locking pieces are brought into abutment with the circumferential edge portions of the pressure plate so as to be displaced in a rotating direction of the rotor in such a state that the main body portion is fittingly superposed on a back surface of the pressure plate.

Further, in the disc brake pad assembly, projecting portions are formed at portions of the circumferential edge portions of the pressure plate which are brought into abutment with one surface of each of the locking pieces, and a circumferential central portion of a part of each of the projecting portions which faces the one surface projects further than both circumferential end portions thereof. Additionally, the circumferential edge portion of the pressure plate and the one surface of each of the locking pieces are spaced apart from each other at portions of the one surface which lie close to both circumferential end portions thereof.

(2) In the disc brake pad assembly configured in the way described under (1) above, a locking recess portion is formed in the circumferential edge portion of the pressure plate. This locking recess portion is concave further radially inwards than both side portions which lie circumferentially adjacent thereto, and a circumferential widthwise dimension of the locking recess portion is larger than a circumferential widthwise dimension of the locking piece. Then, the projecting portion is formed at the portion of the circumferential edge portion of the pressure plate which corresponds to a bottom portion of the locking recess portion.

(3) In the disc brake pad assembly configured in the way described under (2) above, a flat surface which expands in a tangential direction in a circumferential central position of the projecting portion is provided at the circumferential central portion of the projecting portion. Additionally, a circumferential widthwise dimension of the flat surface is smaller than a circumferential widthwise dimension of one of the locking pieces which is brought into engagement with the locking recess portion, and a difference between the circumferential widthwise dimension of the locking recess portion and the circumferential widthwise dimension of the locking piece is smaller than a distance defined between circumferential end edges of the flat surface and circumferential inner surfaces of the locking recess portion.

According to the disc brake pad assembly configured in the way described under (1) above, the construction can be realized at low costs in which the locking pieces which are formed on the shim plate which is displaced circumferentially relative to the pressure plate are brought into direct abutment with the circumferential edge portions of the pressure plate, and moreover, the circumferential displacement of the locking pieces relative to the circumferential edge portions can be executed smoothly.

Namely, since the circumferential edge portions and the one surface of each of the locking pieces are spaced apart from each other at the portions which lie close to the circumferential ends of the one surface based on the presence of the projecting portions formed on the circumferential edge portions of the pressure plate, the end edges of the one surface which have the sharp shape (the radius of curvature of its cross section is almost 0) are never brought into frictional contact with the circumferential edge portions. Because of this, the circumferential end edges of the locking pieces are prevented from biting into the circumferential edge portions, which enables a smooth circumferential displacement of the shim plate relative to the pressure plate.

According to the disc brake pad assembly configured in the ways described under (2) and (3) above, the function and advantage which are described above are obtained in an ensured fashion by the construction in which the circumferential displacement of the shim plate relative to the pressure plate is restricted by the engagement of the circumferential end edges of the locking piece with the circumferential inner surfaces of the locking recess portion. Additionally, even though the radius of curvature of corner portions of the locking recess portion is increased to some extent, the locking piece never rides on the corner portions in association with the circumferential displacement of the shim plate relative to the pressure plate, whereby the orientation of the shim plate is prevented from being made unstable. The durability of a press die which stamps the pressure plate including the locking recess portion is ensured by the increase in radius of curvature of the corner portions, whereby a reduction in fabrication costs of the disc brake pad assembly including the pressure plate can be realized.

BRIEF DESCRIPTION OF DRAWINGS

FIG. 3 is a perspective view of the disc brake pad assembly shown in FIG. 1 as seen from the same direction as the direction in which FIG. 1 is seen with an outer shim plate removed.

FIG. 5 is a projection drawing of the pad alone of the disc brake pad assembly shown in FIG. 1 as seen from the back surface side thereof.

FIG. 10 is a perspective view of the disc brake pad assembly shown in FIG. 8 as seen from the same direction as the direction in which FIG. 8 is seen with an outer shim plate removed.

DESCRIPTION OF EMBODIMENTS

[First Embodiment]

Figure 1:
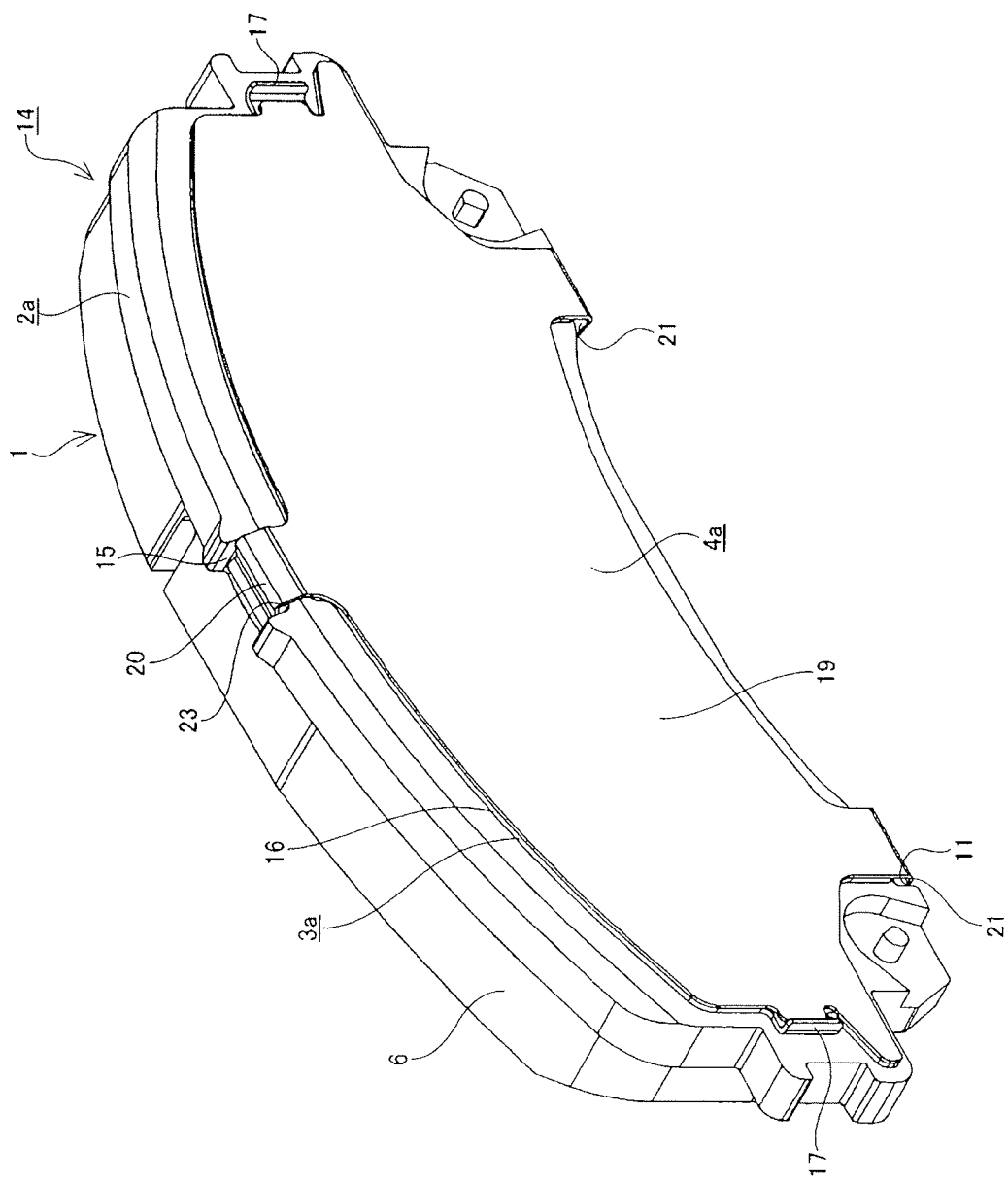
FIG. 1 is a perspective view showing a first embodiment of a disc brake pad assembly according to the invention, which is a view as seen from a radially outward side on a back surface side of a pad.

FIGS. 1 to 6C show a first embodiment of a disc brake pad assembly according to the invention which corresponds to the configurations described under (1) and (2) above. A disc brake pad assembly 14 of the first embodiment includes a pad 1, an inner shim plate 3a, and an outer shim plate 4a.

The pad 1 has a lining 6 which is additionally fixed to a front surface of a pressure plate 2 and is disposed at a portion which faces an axial side surface of a rotor, not shown. A locking recess portion 15 is formed in a circumferential central portion of a radially outward circumferential edge portion of the pressure plate 2a, and a pair of step portions 11, 11 are formed at portions which lie close to both circumferential ends of a radially inward edge portion.

Additionally, the inner shim plate 3a is fabricated by press stamping and bending a corrosion-resistant metallic plate including a stainless steel plate, a rubber-coated stainless steel plate and the like. The shim plate 3a includes a flat plate-shaped inner main body portion 16 and a pair of circumferential end bent-to-rise portions 17, 17 which are bent to rise from both circumferential end portions of the inner main body portion 16 to an opposite side to the pressure plate 2. In addition, through holes 18, 18 are formed in a plurality of locations on the inner main body portion 16 in such a way as to hold lubrication grease in interiors thereof. The inner shim plate 3a is shaped and sized so that circumferential edge portions of the inner shim plate 3 do not project from circumferential edges of the pressure plate 2a as viewed from the direction of an axis of the disc brake pad assembly 14 in such a state that the disc brake pad assembly 14 is assembled.

In addition, the outer shim plate 4a is fabricated by press stamping and bending a corrosion-resistant and elastic metallic plate including a stainless spring steel plate and the like. The shim plate 4a includes a flat plate-shaped outer main body portion 19 and locking pieces which include a radially outward locking piece 20 and a pair of radially inward locking pieces 21, 21. The radially outward locking piece 20 is formed by being bent from a central portion of a radially outward circumferential edge of the outer main body portion 19 towards the pressure plate 2a, and both the radially inward locking pieces 21, 21 are formed by being bent from two positions lying close to circumferential ends of a radially inward edge portion of the outer main body portion 19 towards the pressure plate 2a. The individual locking pieces 20, 21 are such that their front half portions are bent to such an extent that an angle formed by the outer main body portion 19 and themselves becomes an acute angle. Then, the locking pieces 20, 21 can be additionally attached to a back surface side of the pressure plate 2a while the front half portion of the radially outward locking piece 20 is elastically deformed radially outwards and the front half portions of the radially inward locking pieces 20 are elastically deformed radially inwards. Additionally, with the locking pieces 20, 21 additionally attached to the pressure plate 2, the front half portions of the individual locking pieces 20, 21 elastically holds the pressure plate 2a from radial sides thereof therebetween, whereby the outer shim plate 4a is additionally attached to a back surface of the pressure plate 2a while being positioned properly in a radial direction.

Figure 2:
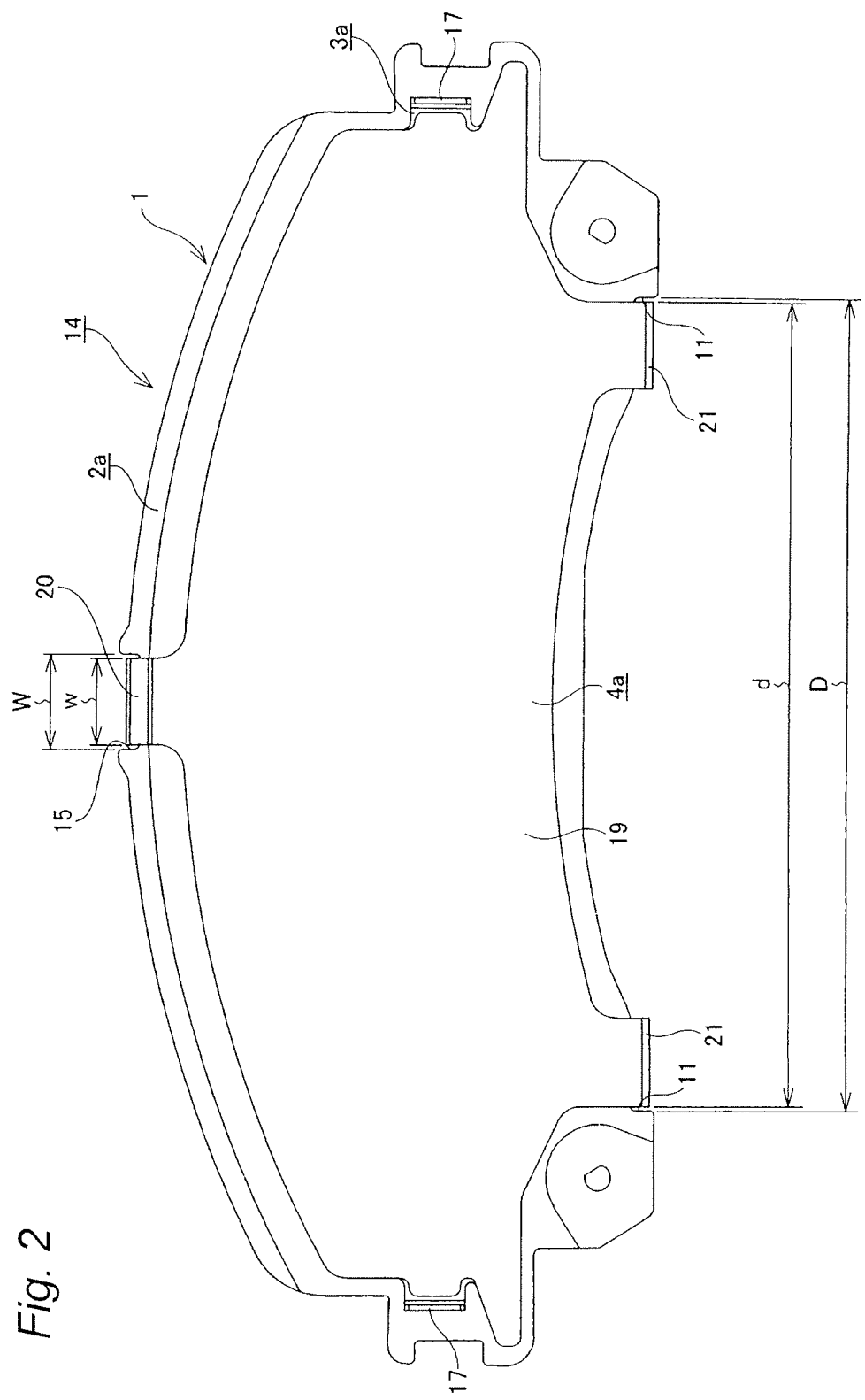
FIG. 2 is a projection drawing of the disc brake pad assembly shown in FIG. 1 as seen from a back surface side thereof.

A circumferential shape of the front half portion of each of the locking pieces 20, 21 is linear. Additionally, as shown in FIG. 2, a circumferential width "w" of the radially outward locking piece 21 is made smaller than a widthwise dimension W of the locking recess portion 15 formed in the pressure plate 2a (w<W). Additionally, a distance "d" defined between opposite circumferential ends of the radially inward locking pieces 21, 21 is made smaller than a distance D defined between the step portions 11, 11 which are formed on the pressure plate 2a (d<D). According to this configuration, with the radially outward locking piece 20 disposed at a widthwise central portion of the locking recess portion 15 (in such a state that the positional relationship between the pressure plate 2a and the outer shim plate 4a is neutral), gaps are interposed individually between the circumferential lateral edges of the radially outward locking piece 20 and the circumferential inner surfaces of the locking recess portion 15, as well as between the circumferential opposite end edges of the radially inner locking pieces 21, 21 and the step portions 11, 11. The pressure plate 2a and the outer shim plate 4a can be displaced relative to each other in the circumferential direction from the neutral state by a distance equaling the gaps. Then, when they are so displaced, the inner surfaces of the front half portions of the locking pieces 20, 21 and the radially outward and inward circumferential edge portions of the pressure plate 2a are brought into frictional contact with each other. Additionally, a distance defined between the circumferential end bent-to-rise portions 17, 17 is made larger than a circumferential length of a portion which is defined between the circumferential end bent-to-rise portions 17, 17. Consequently, the inner shim plate 3a and the outer shim plate 4a can also be displaced circumferential relative to each other.

In the case of the first embodiment, in order for the circumferential displacement between the pressure plate 2a and the outer shim plate 4a to be performed smoothly to the accompaniment with the frictional contact between the inner surfaces of the front half portions of the locking pieces 20, 21 and the radially outward and inward circumferential edge portions, the shape of portions of the radially outward and inward circumferential edge portions of the pressure plate 2a which are brought into frictional contact with the inner surfaces of the front half portions of the locking pieces 20, 21 is devised. Namely, the shape of the portions of the radially outward and inward circumferential edge portions of the pressure plate 2a which are brought into frictional contact with the inner surfaces of the front half portions of the locking pieces 20, 21 is made into a partially cylindrical convexly curved surface, whereby projecting portions 22a, 22b in which a circumferential central portion projects further than circumferential end portions are formed at those portions. It is noted that the inner surfaces of the front half portions of the locking pieces 20, 21 correspond to the one surface of each of the locking pieces.

Specifically speaking, a surface of the projecting portion 22a which is situated at a bottom portion of the locking recess portion 15 is made into a projecting curved surface which projects radially outwards most at a circumferential central portion and is curved gradually radially inwards towards circumferential ends (refer to FIG. 5). Then, this projecting curved surface is allowed to continue smoothly to circumferential inner surfaces of the locking recess portion 15 by partially cylindrical concavely curved surfaces. Additionally, portions of the circumferential inner surfaces of the locking recess portion 15 which lie further radially outwards than the concavely curved surfaces are made into flat surfaces which are parallel to each other. Then, radially inward end portions of the flat surfaces are situated at portions which lie further radially inwards than the apex portion of the projecting portion 22a (the circumferential central portion of the convexly curved surface). The apex portion of the projecting portion 22a is situated at radially middle portions of the flat surfaces.

On the other hand, surfaces of the projecting portions 22b, 22b which are situated at portions lying adjacent to the step portions 11, 11, are each formed into a projecting curved surface which projects radially inwards most largely at a circumferential central portion and which is curved gradually radially outwards towards circumferential ends thereof. Then, the projecting curved surfaces and proximal end portions (radially outer end portions) of the step portions 11, 11 are allowed to continue smoothly by way of partially cylindrical concavely curved surfaces. Additionally, portions of the step portions 11 which lie further radially inwards than the concavely curved surfaces are formed into flat surfaces which are parallel to each other. Radially outward end portions of the flat surfaces are situated further radially outwards than apex portions of the projecting portions 22b, 22b.

Figure 3:
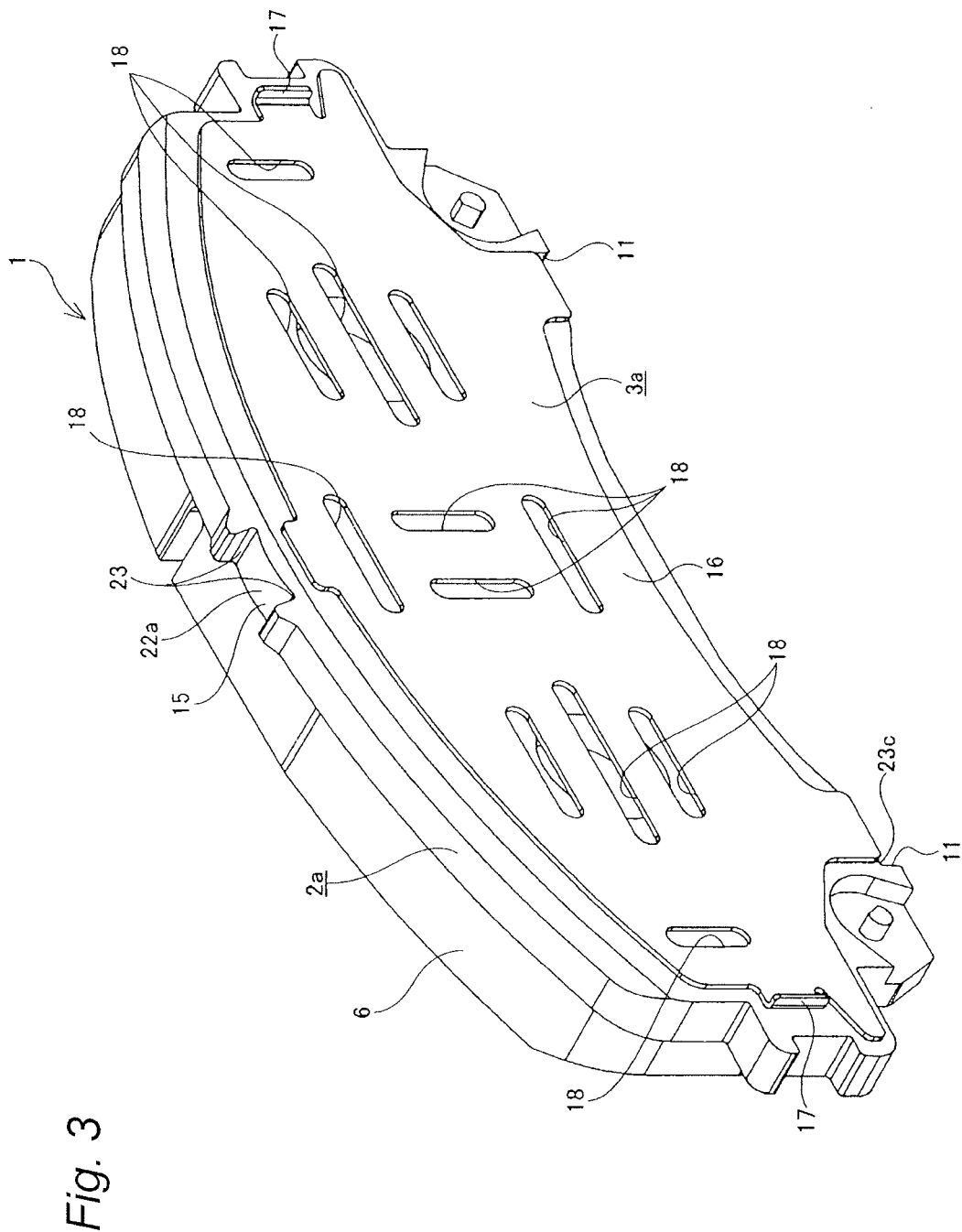
Figure 4:
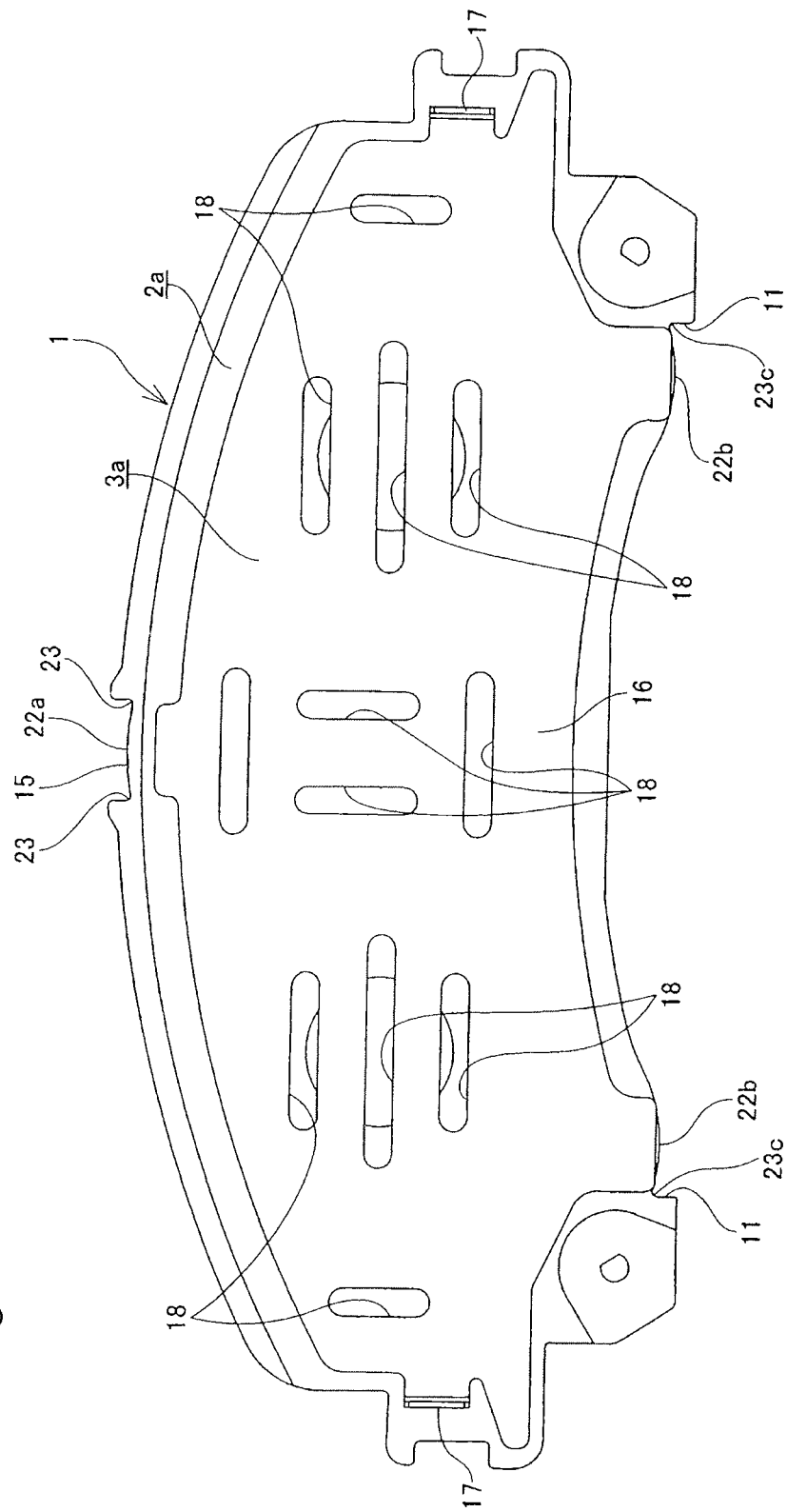
FIG. 4 is a projection drawing of the disc brake pad assembly shown in FIG. 1 as seen from the back surface side thereof with the outer shim plate removed.

In order for the pad 1, the inner shim plate 3a and the outer shim plate 4a to be assembled into the disc brake pad assembly 14, as shown in FIGS. 3 to 4, the inner main body portion 16 of the inner shim plate 3a is fittingly superposed on the back surface of the pressure plate 2a. Following this, the locking pieces 20, 21 are brought into engagement with the radially outward and inward circumferential edge portions of the pressure plate 2a as shown in FIGS. 1 to 2 while the radial distance between the locking pieces 20, 21 is elastically expanded. Namely, the inner surfaces of the front half portions of the locking pieces 20, 21 are brought into elastic abutment with the radially outward and inward circumferential edge portions, respectively. Then, the outer main body portion 19 of the outer shim plate 4a is fittingly superposed on the inner main body portion 16. Grease is applied to fill the individual through holes 18, 18 in advance of assemblage of the outer shim plate 4.

In the state in which the disc brake pad assembly 14 is assembled in the way described above, the inner surfaces of the front half portions of the locking pieces 20, 21 are brought into abutment with the apex portions of the projecting portions 22a, 22b, respectively. Then, the radially outward and inward circumferential edge portions of the pressure plate 2a and the inner surfaces of the front half portions of the locking pieces 20, 21 are spaced apart from each other in such a state that a circumferential positional relationship between the pressure plate 2a and the outer shim plate 4a is in a neutral position. In other words, circumferential end edges of the inner surfaces of the front half portions of the locking pieces 20, 21 which constitute sharp end edges do not abut on the outward and inward circumferential edge portions of the pressure plate 2a.

Figure 13:
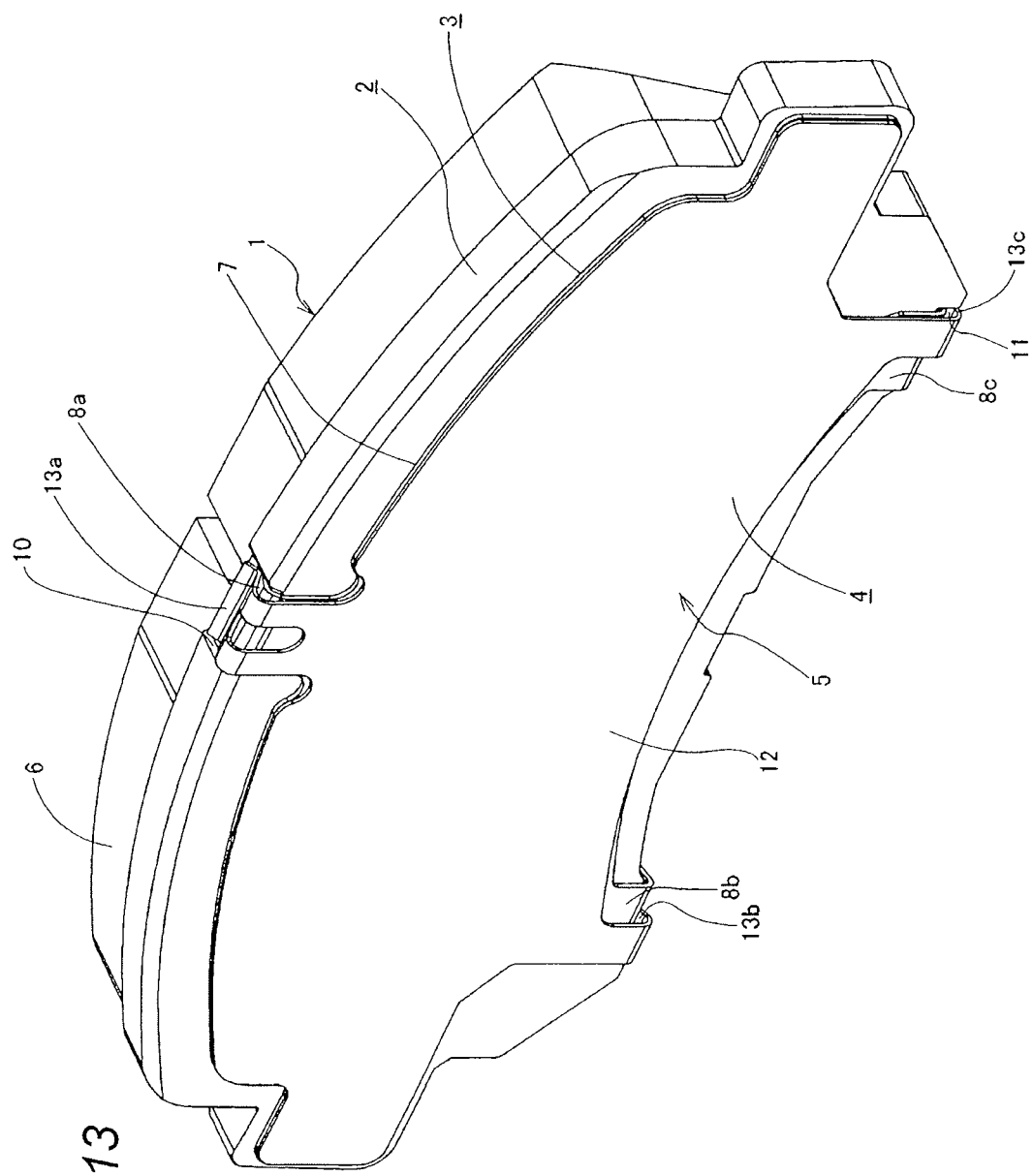
FIG. 13 is a perspective view showing an embodiment of a disc brake pad assembly according to a conventional construction as seen from a radially outward side on a back surface side of a pad.
Figure 14:
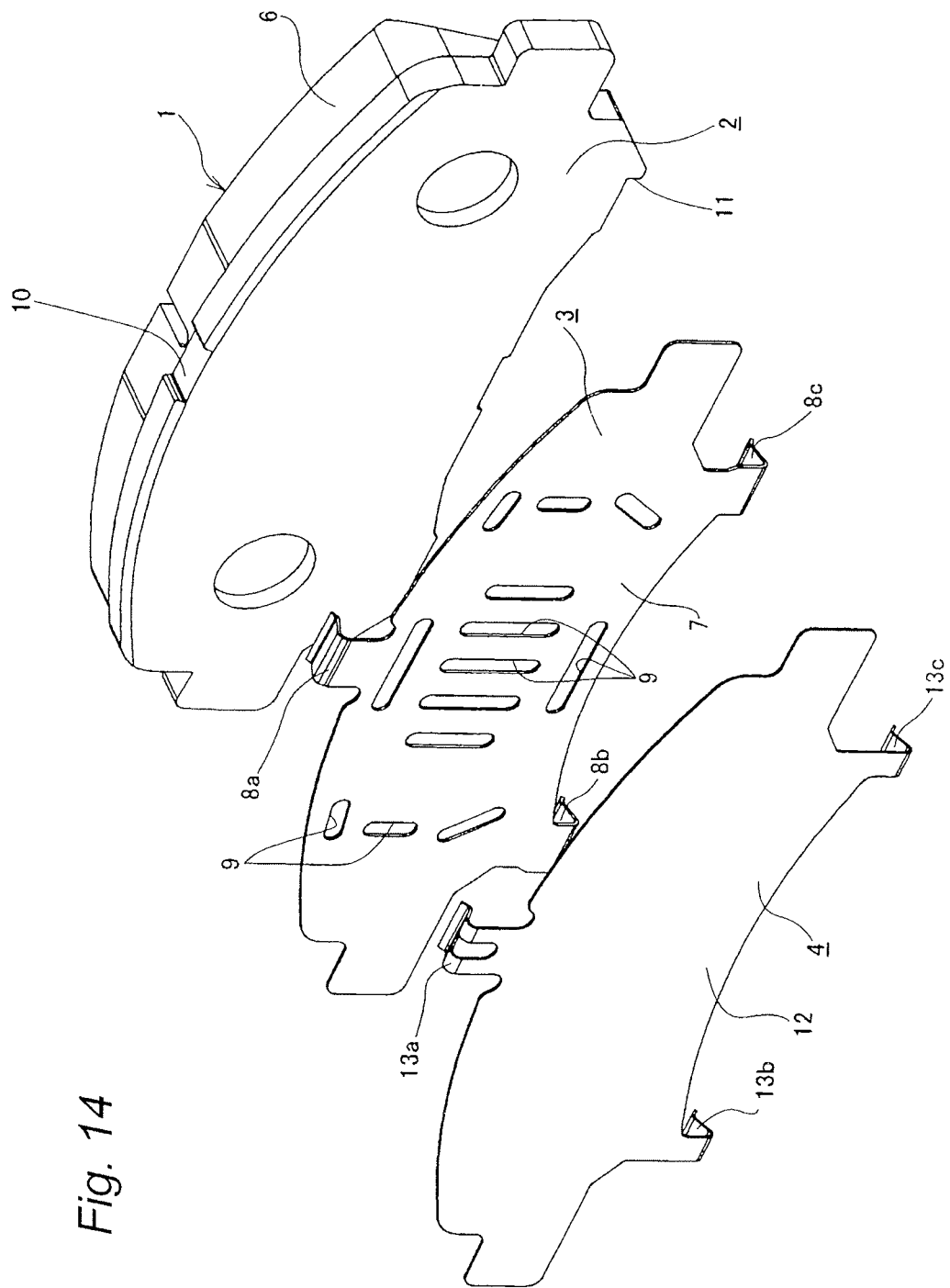
FIG. 14 is a perspective view showing a state resulting before the disc brake pad assembly shown in FIG. 13 is assembled.
Figure 15:
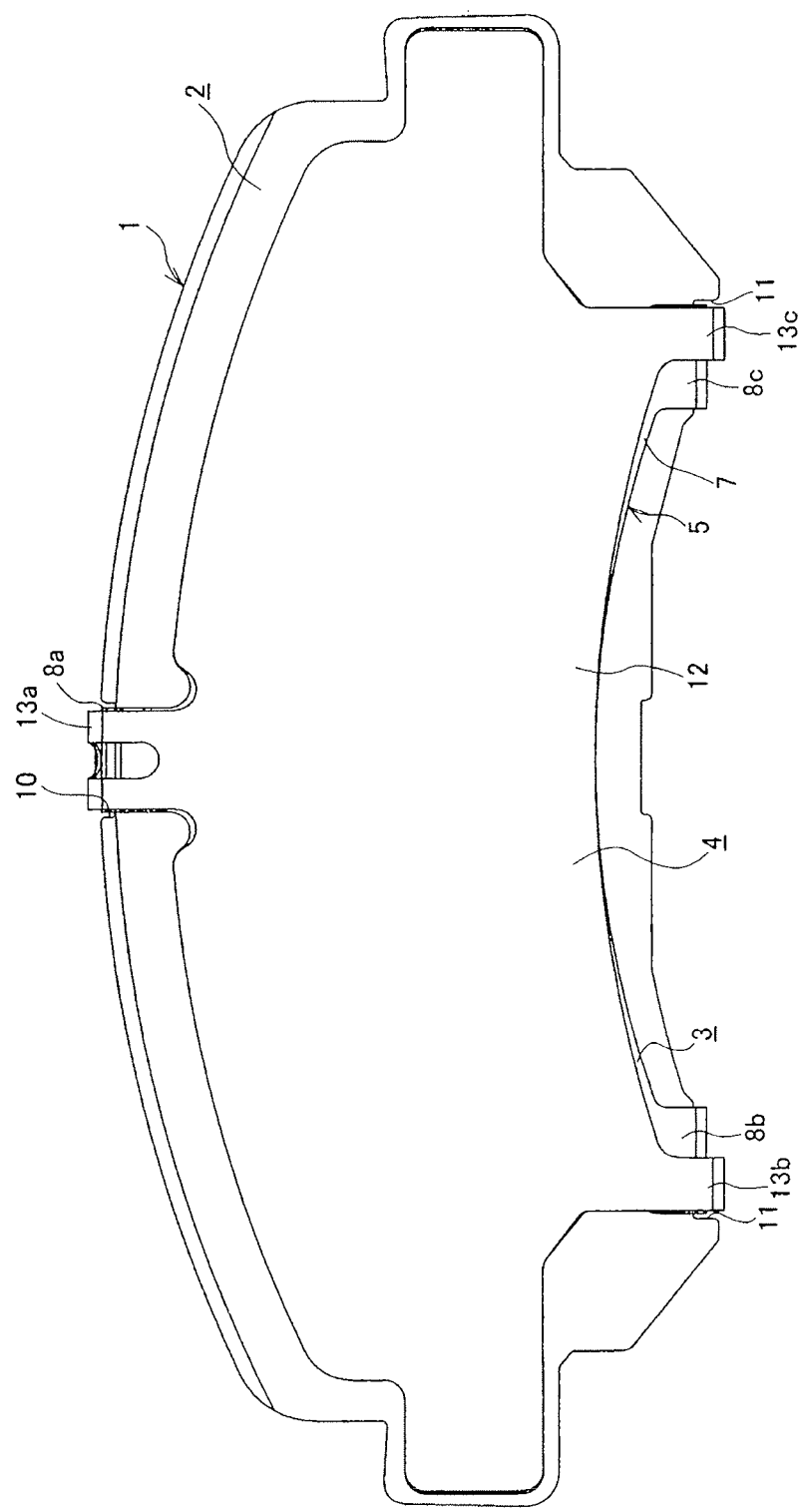
FIG. 15 is a projection drawing of the disc brake pad assembly shown in FIG. 13 as seen from the back surface side of the pad in such a state that the disc brake pad assembly is assembled.

In the disc brake pad assembly 14 of the first embodiment configured in the way described above, the radially outward and inward locking pieces 20, 21 which are formed on the outer shim plate 4a are brought into direct abutment with the outward and inward circumferential edge portions of the pressure plate 2a, respectively. Consequently, compared with the construction in which the inner locking pieces 8a, 8b, 8c and the outer locking pieces 13a, 13b, 13c are fittingly superposed on each other in the radial direction as of the disc brake pad assembly of the conventional construction shown in FIGS. 13 to 15, a projecting amount of the locking pieces 20, 21 from the outward and inward circumferential edges of the pressure plate 2a is suppressed to a low level. Because of this, irrespective of the construction of the disc brake (whether the disc brake is of the floating caliper type or the opposed-piston fixed caliper type, and further, irrespective of the number of pistons), the disc brake pad assembly 14 is made difficult to interfere with the other constituent components of the disc brake, thereby making it possible to enhance the degree of freedom in designing a high-performance disc brake.

Figure 6A:
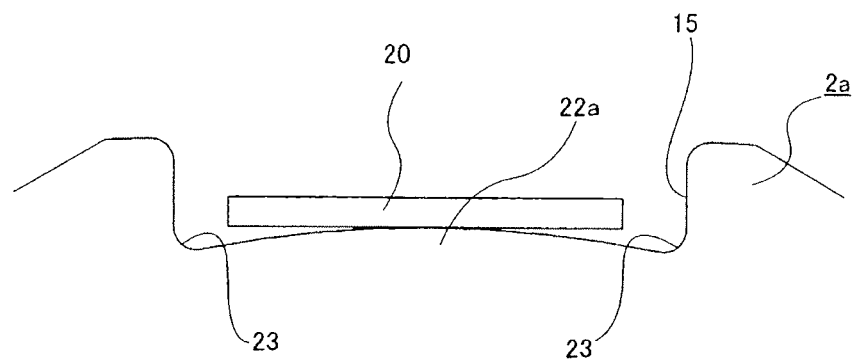
FIG. 6A is an enlarged view of a portion "a" in FIG. 5.

Moreover, in the case of the disc brake pad assembly 14 of the first embodiment, as shown in FIG. 6A, the inner surfaces of the circumferential end portions of the front half portion of each locking piece 20 (21) are spaced apart from the circumferential edge portion of the pressure plate 2a. Then, a smooth circumferential displacement of the outer shim plate 4a relative to the pressure plate 2a is enabled by this configuration. Namely, it is possible to prevent the frictional contact between the circumferential edge portions and the end edges of the one surface of each of the locking pieces 20, 21 based on the presence of the individual projecting portions 22a, 22b which are formed on the radially outward and inward circumferential edge portions of the pressure plate 2a. Because of this, the circumferential end edges of the individual locking pieces 20, 21 are prevented from biting into the circumferential edge portions, which enables the outer shim plate 4a to be displaced smoothly in the circumferential direction relative to the pressure plate 2a. Moreover, since the inner surfaces of the circumferential end portions of the front half portions of the locking pieces 20, 21 are spaced apart from the circumferential edge portions of the pressure plate 2a, the operation of forming the projecting portions 22a, 22b is performed at the same time as the pressure plate 2a is stamped. Because of this, the cost involved in fabricating the construction for preventing the frictional contact and biting is suppressed to a low level.

Further, according to the construction of the disc brake pad assembly 14 of the first embodiment, even though the radius of curvature of corner portions 23, 23 which constitute portions where the projecting portion 22a continues to both the circumferential inner surfaces of the locking recess portion 15 is increased to some extent, the radially outward locking piece 20 is prevented from riding on either of the corner portions 23, 23 as the outer shim plate 4a is displaced circumferentially relative to the pressure plate 2a, thereby making it possible to prevent the orientation of the outer shim plate 4a from being made unstable. Additionally, the increase in radius of curvature of the corner portions 23, 23 ensures the durability of a press which stamps the pressure plate 2a including the locking recess portion 15, whereby the cost involved in fabricating the disc brake pad assembly 14 including the pressure plate 2a can be reduced. This will be described by reference to FIGS. 6B and 6C, in addition to FIG. 6A.

Figure 6B:
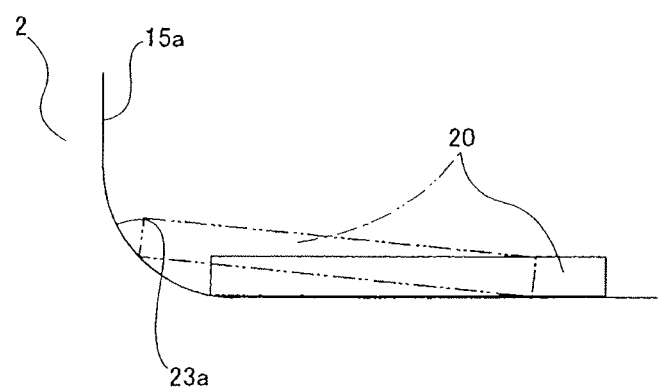
FIG. 6B is an enlarged view of a portion which corresponds to a left lower portion of FIG. 6A which describes a problem caused when a radius of curvature of a corner portion is simply increased.
Figure 6C:
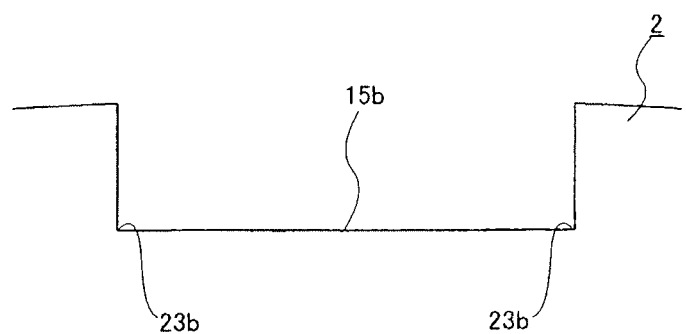
FIG. 6C is a similar view to FIG. 6A which shows a construction to which the invention is not applied.

As shown in FIG. 6B, with a corner portion 23a of a locking recess portion 15a whose bottom surface is formed into a linear shape made into a concavely curved surface whose radius of curvature is increased to some extent, when the radially outward locking piece 20 moves to a circumferential end portion of the locking recess portion 15a, a circumferential end edge of the radially outward locking piece 20 rides on the corner portion 23a. Then, as indicated by chain double-dashed lines in FIG. 6B, the radially outward locking piece 20 is inclined with respect to the bottom surface of the locking recess portion 15a, whereby the orientation of the outer shim plate 4a on which the radially outward locking piece 20 is provided becomes unstable. As a result of this, for example, the outer main body portion 19 tends to rise easily relative to the inner main body portion 16 of the inner shim plate 3a, whereby the noise and vibration suppressing function by the outer shim plate 4a and the inner shim plate 3a is possibly deteriorated.

In order to prevent the noise and vibration suppressing function from being reduced by the cause described above, as shown in FIG. 6C, it is considered that the radius of curvature of corner portions 23b, 23b of a locking recess portion 15b is made as small as possible (a bottom surface and circumferential inner surfaces which are both flat surfaces are caused to intersect each other at right angles). However, in case this shape is adopted, the radius of curvature of a portion of a die which stamps a pressure plate which corresponds to the locking recess portion 15b is increased (a sharp end is necessary), and this makes it difficult to ensure the durability of the portion concerned, causing the fabrication cost of the pressure plate to be increased.

In contrast to this, in the case of the disc brake pad assembly 14 of the first embodiment, by the provision of the projecting portion 22a on the bottom surface of the locking recess portion 15, even though the radius of curvature of the corner portions 23, 23 is increased, the circumferential end edge of the radially outward locking piece 20 never rides on the corner portion 23 in such a state that the radially outward locking piece 20 moves to a circumferential end portion of the locking recess portion 15. In this state, only the flat surface portion of the circumferential inner surface of the locking recess portion 15 which is situated further radially outwards than the corner portion 23 comes into abutment with the circumferential end edge of the radially outward locking piece 20. Consequently, the orientation of the outer shim plate 4a never becomes unstable. As a result of this, it is possible to make ensuring the noise and vibration suppressing function compatible with suppressing the fabrication costs of the pressure plate 2a based on ensuring the durability of the stamping die. Additionally, as to the proximal end portion (the radially outward end portions) of the step portions 11, 11, the radius of curvature of corner portions 23c, 23c can be increased for the same reason, whereby the fabrication costs of the pressure plate 2a can be reduced based on the improvement in durability of the press die.

[Second Embodiment]

Figure 7:
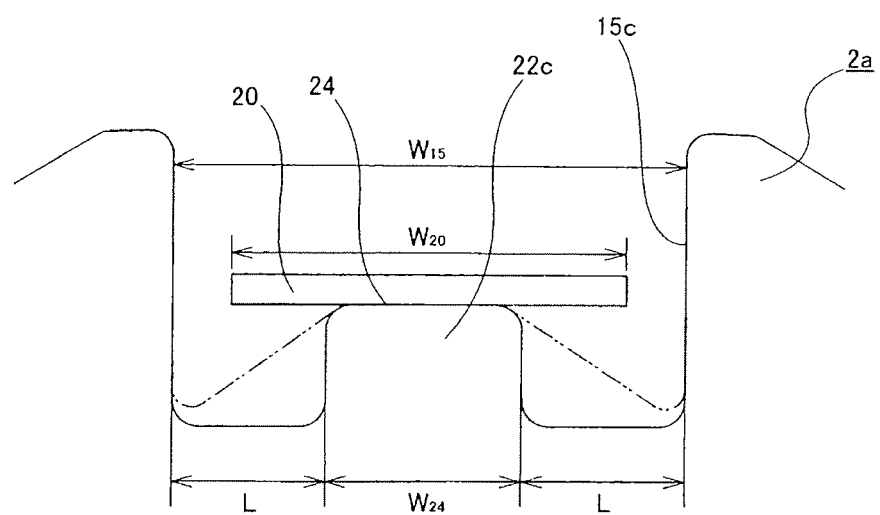
FIG. 7 is a similar view to FIG. 6A showing a different example of a shape of a projecting portion which is formed at a bottom portion of a locking recess portion.
Figure 8:
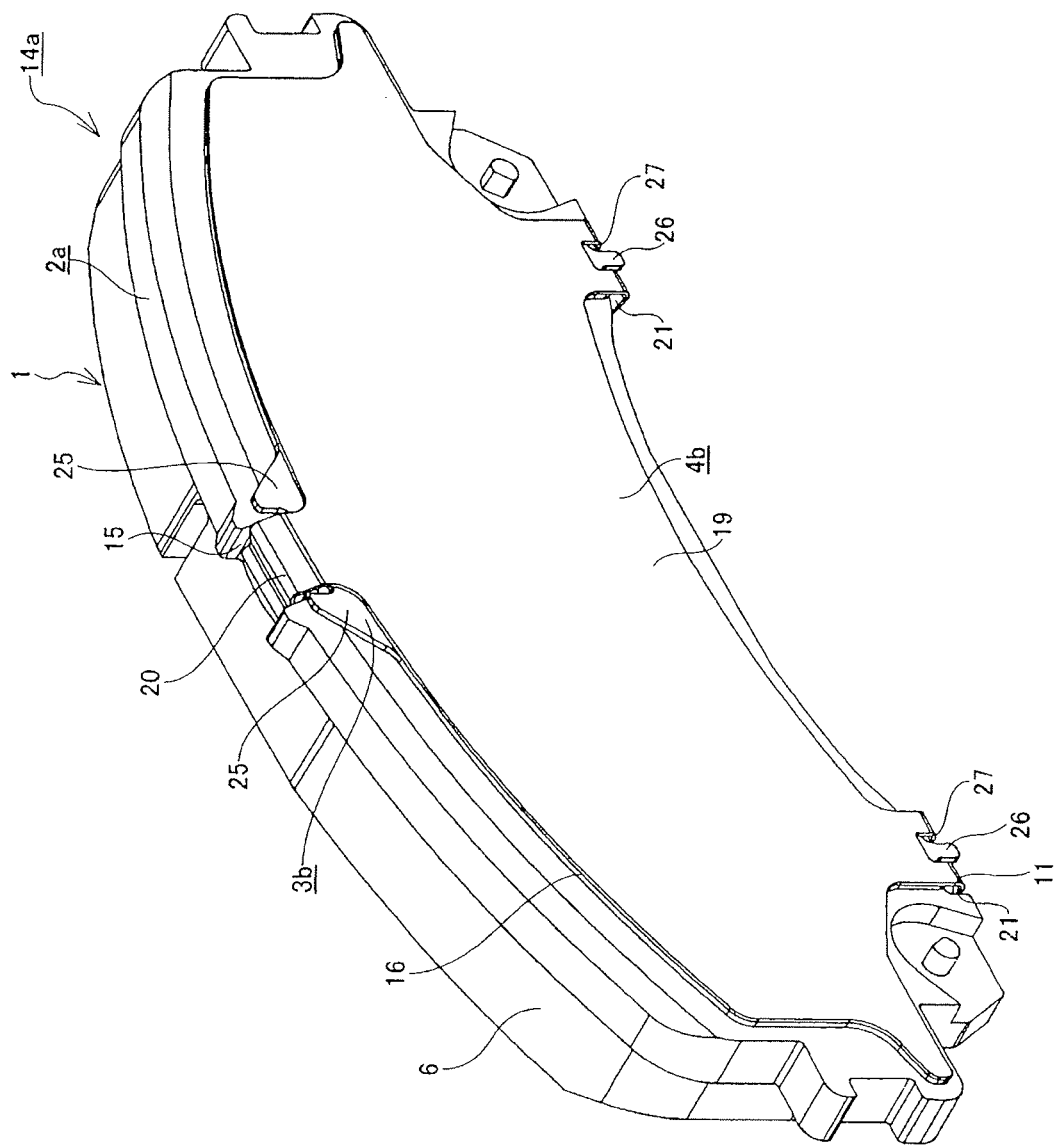
FIG. 8 is a similar view to FIG. 1 showing a second embodiment of a disc brake pad assembly according to the invention.
Figure 9:
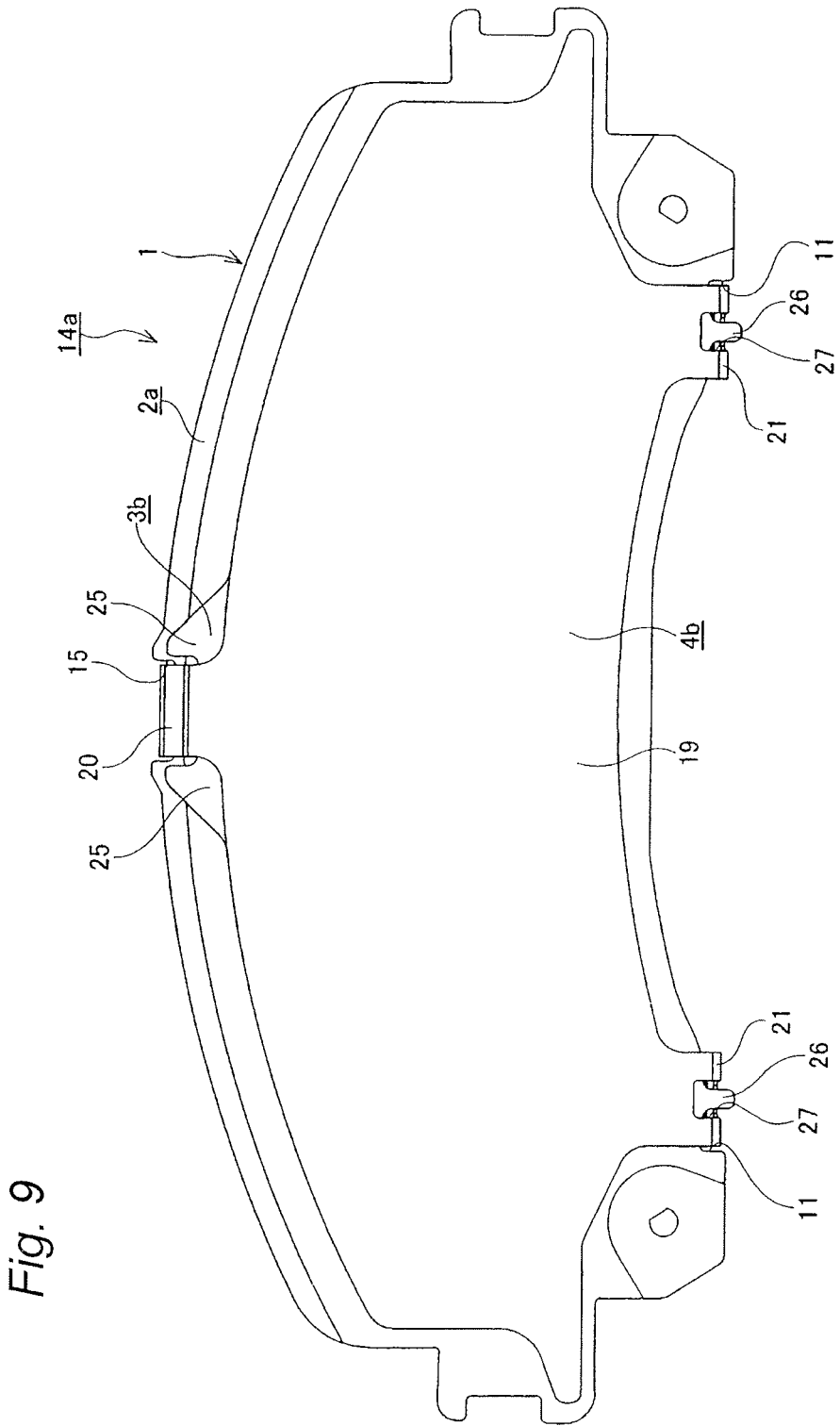
FIG. 9 is a projection drawing of the disc brake pad assembly shown in FIG. 8 as seen from a back surface side thereof.
Figure 10:
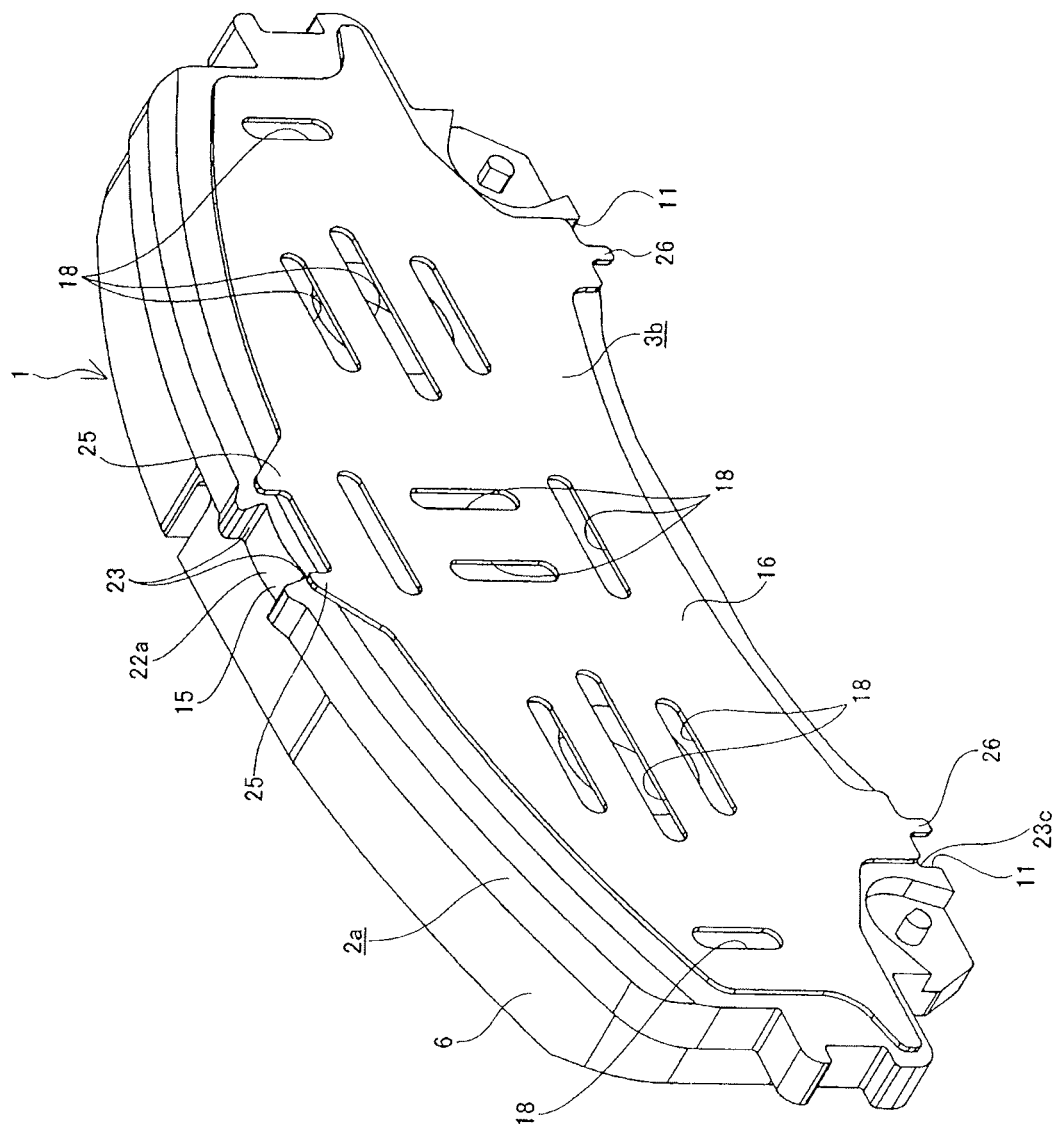
Figure 11:
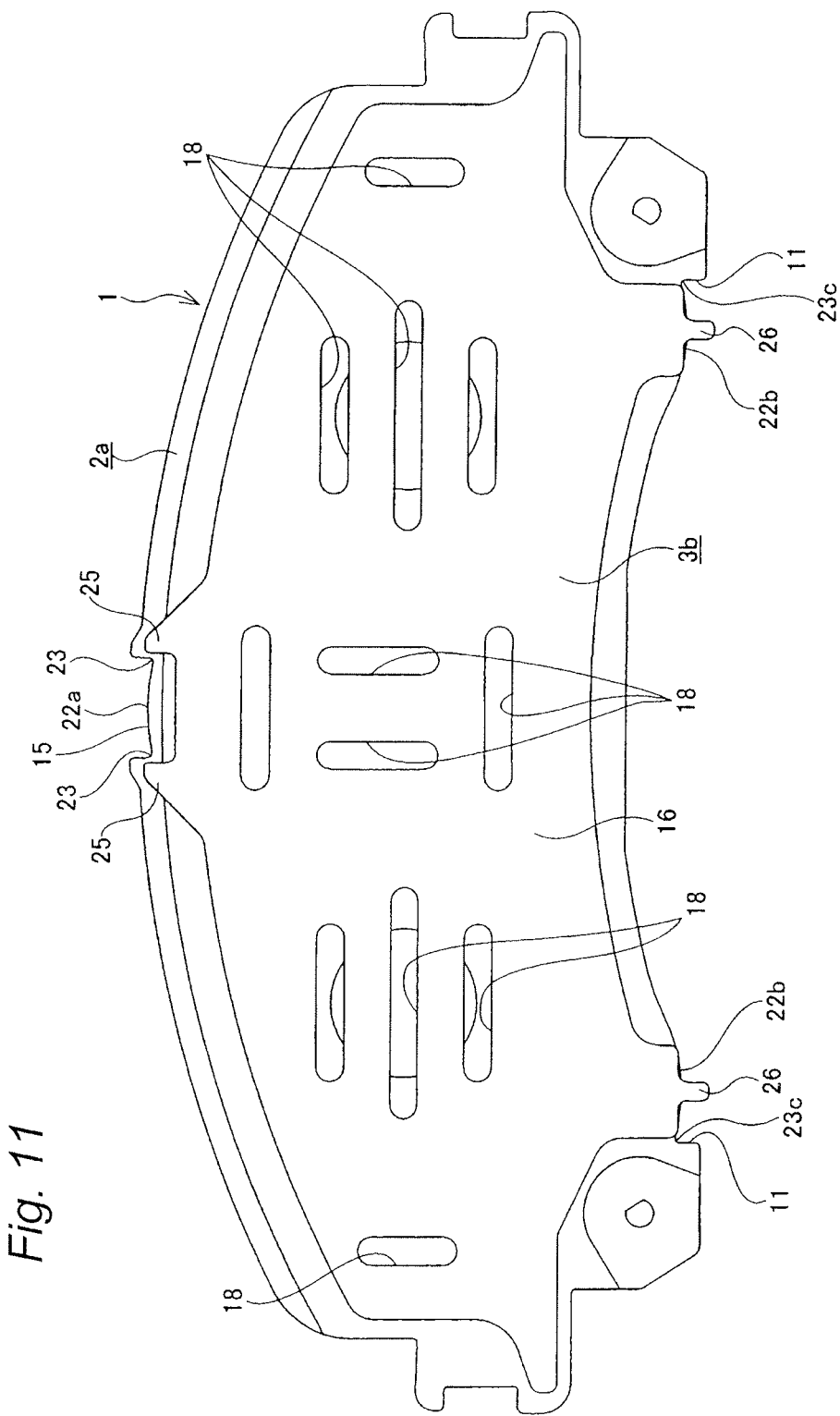
FIG. 11 is a projection drawing of the disc brake pad assembly shown in FIG. 8 as seen from the back surface side thereof with the outer shim plate removed.
Figure 12:
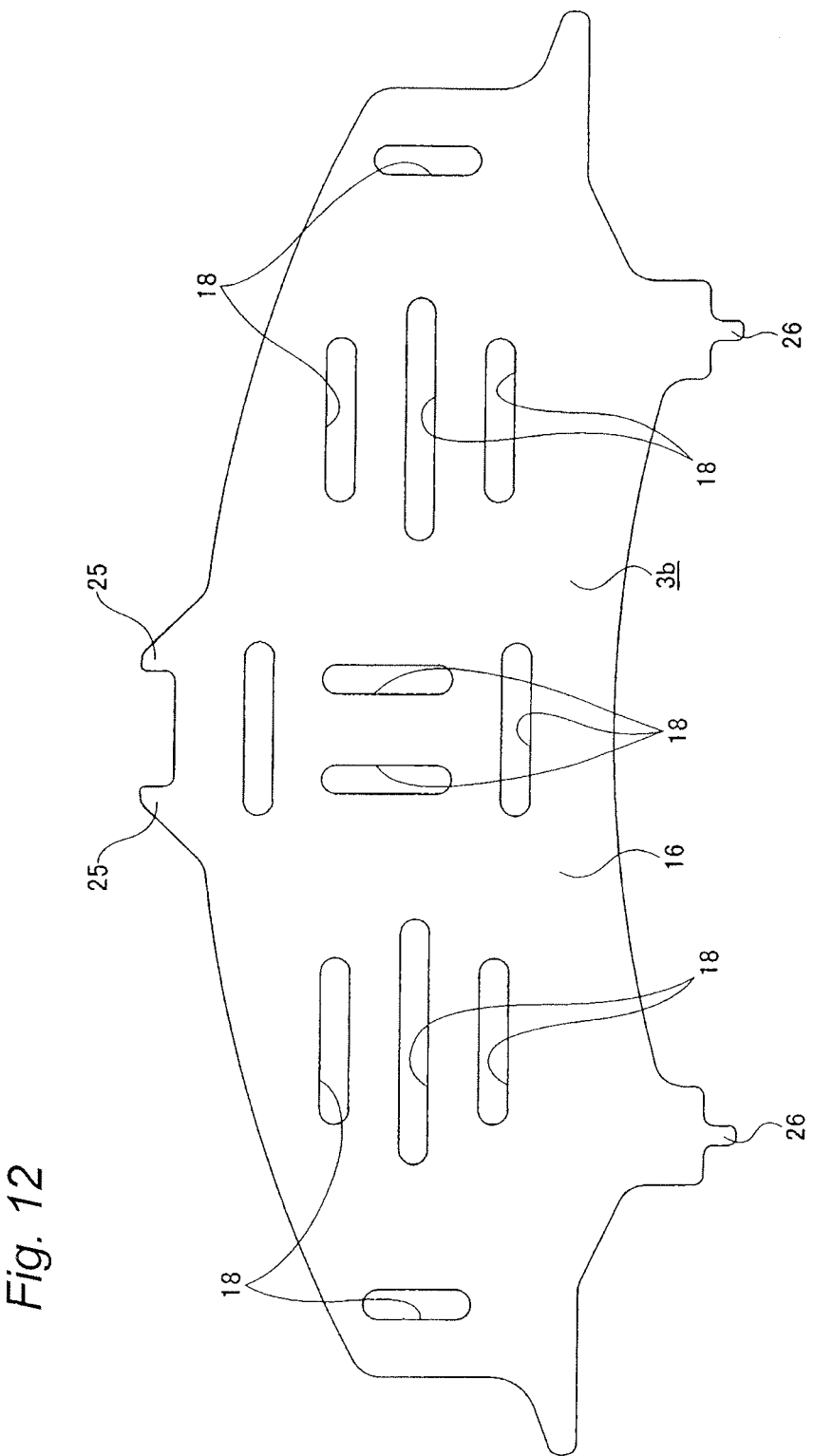
FIG. 12 is a projection drawing of an inner shim plate alone of the disc brake pad assembly shown in FIG. 8 as seen from a back surface side thereof.

FIG. 7 shows a second embodiment of a disc brake pad assembly according to the invention which corresponds to the configurations described under (1) to (3) above. In the case of the second embodiment, the shape of a projecting portion 22c which is provided on a bottom surface of a locking recess portion 15c which is formed in a circumferential central portion of a radially outward circumferential edge of a pressure plate 2a differs from the first embodiment. Specifically, a flat surface 24 is formed at a circumferential central portion of the projecting portion 22c. This flat surface 24 expands in a tangential direction and an axial direction in a circumferential central position of the projecting portion 22c. A circumferential widthwise dimension $W_{24}$ of the flat surface 24 is made smaller than a circumferential widthwise dimension $W_{20}$ of a front half portion of a radially outward locking piece 20 which is brought into engagement with the locking recess portion 15c ($W_{24} < W_{20}$). Additionally, a difference between a circumferential widthwise dimension $W_{15}$ of the locking recess portion 15c and the circumferential widthwise dimension $W_{20}$ of the front half portion of the radially outward locking piece 20 is made smaller than a distance L defined between circumferential end edges of the flat surface 24 and circumferential inner surfaces of the locking recess portion 15c $\{(W_{15} - W_{20}) < L\}$.

According to the construction of the disc brake pad assembly of the second embodiment which is configured as described above, the frictional contact between the circumferential end edges of the front half portion of the radially outward locking piece 20 and the radially outward circumferential edge of the pressure plate 2a is prevented in an ensured fashion. Moreover, the abutment state of the radially outward circumferential edge with the radially outward locking piece 20 is stabilized, thereby making it possible to enhance the noise and vibration suppressing function sufficiently. Namely, since the orientation of an outer shim plate which includes the radially outward locking piece 20 is stabilized as a result of the front half portion of the radially outward locking piece 20 being brought into abutment with an apex portion of the projecting portion 22c over a wide area, the disc brake pad assembly of the second embodiment becomes advantageous in ensuring the suppressing function. Additionally, a contact pressure at the contact portion between the front half portion of the radially outward locking piece 20 and the apex portion of the projecting portion 22c is suppressed to a low level, and therefore, the disc brake pad assembly of the second embodiment becomes advantageous in suppressing a wear at the contact portion associated with the displacement of the outer shim plate 4a. Further, since the dimensions $W_{24}$, $W_{20}$, $W_{15}$ and L of the individual portions are restricted as described above, even in such a state that the outer shim plate 4a is displaced most in the circumferential direction relative to the pressure plate 2a, the circumferential end edges of the radially outward locking piece 20 never faces the apex portion of the projecting portion 22c. Consequently, the circumferential end edge of the radially outward locking piece 20 which constitutes a sharp end is never brought into frictional contact with the apex portion of the projecting portion 22c.

When carrying out the second embodiment constructed as described above, there is imposed no specific limitation on the shape of portions of the locking recess portion 15 which lie between the circumferential end edges of the flat surface 24 and the circumferential inner surfaces of the locking recess portion 15c, as long as the portions concerned are concave further radially inwards than the flat surface 24 and the radius of curvature of corner portions can be increased to some extent. The projecting portion 22c may be formed into a rectangular shape as indicated by solid lines in FIG. 7 or may be formed into an angular shape as indicated by chain double-dashed lines shown in the same figure.

[Third Embodiment]

FIGS. 8 to 12 show a third embodiment of a disc brake pad assembly according to the invention which corresponds to the configurations described under (1) and (2) above. In the case of the third embodiment, circumferential engagement portions are provided between an inner shim plate 3b and an outer shim plate 4b, whereby the inner shim plate 3b is prevented from being dislocated circumferentially from between a pressure plate 2a and the outer shim plate 4a in such a state that a disc brake pad assembly 14a is assembled. The circumferential end bent-to-rise portions 17, 17 (refer to FIGS. 1 to 4) are omitted here which are provided at the circumferential end portions of the inner shim plate 3a in the first embodiment described above. In the case of the third embodiment, specifically, a pair of radially outward projecting pieces 25, 25 are formed at portions which lie close to the center of a radially outward circumferential edge of the inner shim plate 3b, and similarly, a pair of radially inward projecting pieces 26, 26 are formed at portions which lie close to ends of a radially inward circumferential edge thereof. Additionally, locking holes 27, 27 are formed in circumferential central portions of a pair of radially inward locking pieces 21, 21 which are formed at portions which lie close to ends of a radially inward circumferential edge of the outer shim plate 4b. Then, in such a state that the disc brake pad assembly 14a is assembled, a radially outward locking piece 20 which is formed at a circumferential central portion of a radially outward circumferential edge of the outer shim plate 4b is brought into loose engagement with a portion defined between the radially outward projecting pieces 25, 25 (so as to be displaced circumferentially). Additionally, the radially inward projecting pieces 26, 26 are loosely inserted through the locking holes 27, 27 (so as to be displaced circumferentially).

Also, by the construction of the third embodiment described above, the inner shim plate 3b is prevented from being dislocated after the disc brake pad assembly 14a is assembled and before it is assembled into the disc brake, whereby the transporting work of the disc brake pad assembly 14a and assembling work of the disc brake can be facilitated. When carrying out the third embodiment constructed as described above, the shapes and dimensions of the individual projecting pieces 25, 26 are controlled to prevent the interference of the projecting pieces 25, 26 with other constituent members (support, caliper, rotor and the like) of the disc brake.

Here, the characteristics of the embodiments of the disc brake pad assemblies according to the invention will be summarized briefly and itemized in paragraphs i to iii below.

[i] The disc brake pad assembly 14 comprises the pad 1 which has the lining 6 additionally attached to the front surface of the pressure plate 2a and which is disposed at the portion facing the axial side surface of the rotor and the shim plate (the outer shim plate) 4a. The shim plate (the outer shim plate) 4a includes the flat plate-shaped main body portion (the outer main body portion) 19 and the plurality of locking pieces (the radially outward locking piece and the radially inward locking pieces) 20, 21 which are bent from the circumferential edge portions of the main body portion (the outer main body portion) 19 towards the pressure plate 2a. The locking pieces (the radially outward locking piece and the radially inward locking pieces) 20, 21 are brought into abutment with the circumferential edge portions of the pressure plate 2a so as to be displaced in the rotating direction of the rotor in such a state that the main body portion (the outer main body portion) 19 is fittingly superposed on the back surface of the pressure plate 2a. The projecting portions 22a, 22b are formed at the portions of the circumferential edge portions of the pressure plate 2a which are brought into abutment with one surface (an inner surface of a front half portion) of each of the locking pieces (the radially outward locking piece and the radially inward locking pieces) 20, 21. The circumferential central portion of a part of each of the projecting portions 22a, 22b which faces the one surface (the inner surface of the front half portion) projects further than both the circumferential end portions thereof. And the circumferential edge portion of the pressure plate 2a and the one surface (the inner surface of the front half portion) of each of the locking pieces (the radially outward locking piece and the radially inward locking pieces) 20, 21 are spaced apart from each other at the portions of the one surface (the inner surface of the front half portion) which lie close to both the circumferential end portions thereof.

[ii] The disc brake pad assembly 14 according to [i] above, wherein the locking recess portion 15 is formed in the circumferential edge portion of the pressure plate 2a, The locking recess portion 15 is concave further radially inwards than both the side portions which lie circumferentially adjacent thereto and whose circumferential widthwise dimension W is larger than the circumferential widthwise dimension "w" of the locking piece (the radially outward locking piece) 20, and wherein the projecting portion 22a is formed at the portion of the circumferential edge portion of the pressure plate 2a which corresponds to a bottom portion of the locking recess portion 15.

[iii] The disc brake pad assembly 14 according to [ii] above, wherein the flat surface 24 which expands in the tangential direction in the circumferential central position of the projecting portion 22c is provided at the circumferential central portion of the projecting portion 22c, and wherein the circumferential widthwise dimension $W_{24}$ of the flat surface 24 is smaller than the circumferential widthwise dimension $W_{20}$ of the locking piece 20 of the locking pieces (the radially outward locking piece and the radially inward locking piece) 20, 21 which is brought into engagement with the locking recess portion 15, and the difference between the circumferential widthwise dimension $W_{15}$ of the locking recess portion 15 and the circumferential widthwise dimension $W_{20}$ of the locking piece 20 is smaller than the distance defined between the circumferential end edges of the flat surface 24 and the circumferential inner surfaces of the locking recess portion 15.

While the invention has been described in detail and by reference to the specific embodiments, it is obvious to those skilled in the art to which the invention pertains that various alterations or modifications can be made thereto without departing from the spirit and scope of the invention. This patent application is based on Japanese Patent Application (No. 2011-199674) filed on Sep. 13, 2011, the contents of which are incorporated herein by reference.

Industrial Applicability

The number of shim plates which make up the disc brake pad assembly of the invention is not limited to two. The invention can be carried out with a single shim plate only (the inner shim plate is removed from the constructions of the embodiments). On the contrary, the invention can also be applied to a construction in which a third shim plate (for example, a middle shim plate) is sandwiched between a pressure plate and an inner plate or between the inner shim plate and an outer shim plate.

Reference Signs List
1 pad
2, 2a pressure plate
3, 3a, 3b inner shim plate
4, 4a, 4b outer shim plate
5 combined shim plate
6 lining
7 inner main body portion
8a, 8b, 8c inner locking pieces
9 through hole
10 locking recess portion
11 step portion
12 outer main body portion
13a, 13b, 13c outer locking pieces
14, 14a disc brake pad assembly
15, 15a, 15b, 15c locking recess portion
16 inner main body portion
17 circumferential end bent-to-rise portion
18 through hole
19 outer main body portion
20 radially outward locking piece
21 radially inward locking piece
22a, 22b, 22c projecting portion
23, 23a, 23b, 23c corner portion
24 flat portion
25 radially outward projecting piece
26 radially inward projecting piece
27 locking hole

The invention claimed is:

1. A disc brake pad assembly, comprising:
a pad which includes a lining attached to a front surface of a pressure plate and which is configured to face an axial side surface of a rotor; and
a shim plate, wherein
the shim plate includes a flat plate-shaped main body portion, and a plurality of locking pieces which are bent from circumferential edge portions of the main body portion towards the pressure plate,
the locking pieces are brought into abutment with circumferential edge portions of the pressure plate so as to be displaced in a rotating direction of the rotor in such a state that the main body portion is fittingly superposed on a back surface of the pressure plate,
projecting portions are formed at portions of the circumferential edge portions of the pressure plate which are brought into abutment with one surface of each of the locking pieces,
a circumferential central portion of a part of each of the projecting portions which faces the one surface projects further than both circumferential end portions thereof, and
the circumferential edge portion of the pressure plate and the one surface of each of the locking pieces are spaced apart from each other at portions of the one surface which lie close to both circumferential end portions thereof.

2. The disc brake pad assembly according to claim 1, wherein
a locking recess portion is formed in the circumferential edge portion of the pressure plate,
the locking recess portion is concave further radially inwards than both side portions which lie circumferentially adjacent thereto,
a circumferential widthwise dimension of the locking recess portion is larger than a circumferential widthwise dimension of the locking piece, and the projecting portion is formed at a portion of the circumferential edge portion of the pressure plate which corresponds to a bottom portion of the locking recess portion.

3. The disc brake pad assembly according to claim 2, wherein
a flat surface which expands in a tangential direction in a circumferential central position of the projecting portion is provided at the circumferential central portion of the projecting portion,
a circumferential widthwise dimension of the flat surface is smaller than a circumferential widthwise dimension of one of the locking pieces which is brought into engagement with the locking recess portion, and
a difference between the circumferential widthwise dimension of the locking recess portion and the circumferential widthwise dimension of the locking piece is smaller than a distance defined between circumferential end edges of the flat surface and circumferential inner surfaces of the locking recess portion.

* * * * *